US008670849B2

(12) United States Patent
Mizutani

(10) Patent No.: US 8,670,849 B2
(45) Date of Patent: Mar. 11, 2014

(54) DIGITAL SIGNAL SWITCHING APPARATUS AND METHOD OF SWITCHING DIGITAL SIGNALS

(75) Inventor: Tomoji Mizutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 1474 days.

(21) Appl. No.: 11/789,484

(22) Filed: Apr. 25, 2007

(65) Prior Publication Data

US 2007/0280490 A1 Dec. 6, 2007

(30) Foreign Application Priority Data

Apr. 27, 2006 (JP) ................................ P2006-123840

(51) Int. Cl.
*G06F 17/00* (2006.01)

(52) U.S. Cl.
USPC ................................ 700/94; 381/119; 375/368

(58) Field of Classification Search
CPC ........... H04L 63/08; G06F 21/00; G06F 3/16; G06F 3/165
USPC ............................................................ 700/94
See application file for complete search history.

(56) References Cited

U.S. PATENT DOCUMENTS 4,757,518 A * 7/1988 Lagadec ........................ 375/253
5,647,008 A * 7/1997 Farhangi et al. .............. 381/119
5,923,710 A * 7/1999 Shuholm et al. .............. 375/260
6,212,199 B1 * 4/2001 Oxford .......................... 370/466
6,240,140 B1 * 5/2001 Lindbergh et al. ............ 375/260
6,266,337 B1 * 7/2001 Marco ........................... 370/410
6,446,037 B1 * 9/2002 Fielder et al. ................. 704/229
6,487,535 B1 * 11/2002 Smyth et al. .................. 704/500
6,490,705 B1 * 12/2002 Boyce ........................... 714/776
6,754,548 B1 * 6/2004 Yoshii et al. ..................... 700/94
6,757,302 B1 * 6/2004 Lydon et al. .................. 370/503
6,947,430 B2 * 9/2005 Bilic et al. ............... 370/395.71
7,392,195 B2 * 6/2008 Fejzo ............................ 704/500
7,403,828 B2 * 7/2008 Bader et al. ...................... 700/94

(Continued)

FOREIGN PATENT DOCUMENTS

JP 6-113198 4/1994
JP 7-203296 8/1995
JP 2001-257654 9/2001
JP 2003-60988 2/2003

OTHER PUBLICATIONS

ISO N6435, Audio Lossless Coding Specification; Published Mar. 2004.*
Audio Precision 2700 test set: manual copyright 2004.*

(Continued)

*Primary Examiner* — Paul McCord
(74) *Attorney, Agent, or Firm* — Frommer Lawrence & Haug LLP; William S. Frommer; Ellen Marcie Emas

(57) ABSTRACT

A digital signal switching apparatus is provided. The digital signal switching apparatus inputs and outputs digital signals to which status information formed of a block including a plurality of frames is added. The digital signal switching apparatus includes: a retrieving unit configured to retrieve the status information from the digital signal to which switching processing was performed; a storing unit configured to store one or more blocks of the status information retrieved by the retrieving unit; and an adding unit configured to add again the status information stored in the storing unit by the block to a position of the status information in the digital signal to which the switching processing was performed.

8 Claims, 7 Drawing Sheets

(56) References Cited

U.S. PATENT DOCUMENTS

| | | | | |
|---|---|---|---|---|
| 7,418,380 | B2 * | 8/2008 | Chen et al. | 704/226 |
| 2002/0053049 | A1 * | 5/2002 | Shiomoto et al. | 714/701 |
| 2002/0114359 | A1 * | 8/2002 | Ibaraki et al. | 370/535 |
| 2002/0168029 | A1 * | 11/2002 | Onizuka et al. | 375/316 |
| 2005/0234731 | A1 * | 10/2005 | Sirivara et al. | 704/500 |
| 2005/0283350 | A1 * | 12/2005 | Luu et al. | 703/19 |
| 2006/0174267 | A1 * | 8/2006 | Schmidt | 725/39 |
| 2006/0268913 | A1 * | 11/2006 | Singh et al. | 370/412 |
| 2007/0011004 | A1 * | 1/2007 | Liebchen | 704/229 |
| 2007/0014297 | A1 * | 1/2007 | Liebchen | 370/395.64 |
| 2007/0067472 | A1 * | 3/2007 | Maertens et al. | 709/230 |
| 2007/0110203 | A1 * | 5/2007 | Mizutani | 375/355 |
| 2007/0174523 | A1 * | 7/2007 | Lin et al. | 710/65 |
| 2008/0201292 | A1 * | 8/2008 | Roethig et al. | 707/1 |
| 2009/0063159 | A1 * | 3/2009 | Crockett | 704/500 |
| 2009/0097487 | A1 * | 4/2009 | Mishra et al. | 370/392 |

OTHER PUBLICATIONS

ViewCast Niagara hardware codec: manual copyright 2007.*

* cited by examiner

RELATED ART

RELATED ART

DIGITAL SIGNAL SWITCHING APPARATUS AND METHOD OF SWITCHING DIGITAL SIGNALS

CROSS REFERENCES TO RELATED APPLICATIONS

The present invention contains subject manner related to Japanese Patent Application JP 2006-123840 filed in the Japanese Patent Office on Apr. 27, 2006, the entire contents of which being incorporated herein by reference.

BACKGROUND OF THE INVENTION

1. Field of the Invention

The present invention relates to an apparatus which inputs digital signals of two or more systems, performs switching processing and outputs the processed signals, particularly to the apparatus suitable for the input and output of digital signals to which status information formed of a block including a plurality of frames is added.

2. Description of the Related Art

As a kind of audio apparatus for broadcasting service, there is a switching apparatus called a digital audio router. The digital audio router is a switching apparatus that inputs digital audio signals of two or more systems (digital audio signals from a microphone, a video camera including microphone, and the like), and which outputs the digital audio signals respectively by switching apparatuses (VTR, Audio mixer, and the like).

The digital audio router may require the following two basic performances:

(1) an amount of processing delay in the apparatus is as small as possible; and (2) an output signal after switching conforms to standards.

In order to satisfy those requirements, for example, Japanese Unexamined Utility Model (Registration) Application Publication No. H4-69938 discloses a digital audio router in which switching processing is performed on each frame after matching phases of input digital-audio signals to be switched.

FIG. 1 is a block diagram showing an example of a configuration of a digital audio router of the related art (the example including two input/output systems for the convenience of simplified explanation). Further, FIGS. 2A to 2G show an example of a timing chart when the digital audio router shown in FIG. 1 performs switching operation. Here, the digital audio router for AES/EBU signals frequently used in broadcasting service is shown in FIG. 1. Before explaining the digital audio router, an AES/EBU format is described using FIG. 3. The AES/EBU signal includes 192 frames from frame 0 to frame 191 constituting one block. One frame includes subframe1 and subframe2.

Each of the subframes includes 32 bits in total, specifically, four bits of preamble, four bits of auxiliary data or audio data, twenty bits of audio data, one bit of validity bit V, one bit of user bit U, one bit of channel status bit C, and one bit of parity bit P. The preambles of the subframe1 and subframe2 of the frame 0 are Z and Y respectively, and the preambles of subframe1 and subframe2 of frames 1 to 191 are X and Y respectively.

The channel status bit C of each subframe represents status information (information on frequency, number of bits of audio data, channel mode or the like) on the audio channel transferred using the subframe, and the status information as a whole is formed of one block including 192 bits (frames 0 to 191).

Returning to description on FIG. 1, the AES/EBU signals AESI1 and AESI2 of two systems (in general, signals phases of which are not matched as shown in FIGS. 2B and 2C) which are input to the digital audio router, are demodulated by decoders 51(1), 51(2) respectively to NRZ (Non Return to Zero) signals, which are written to FIFO memories 52(1), 52(2) for phase correction.

A CPU circuit/apparatus internal timing signal generating circuit 53 supplies a timing signal (word clock shown in FIG. 2A) generated in the digital audio router to the FIFO memories 52(1), 51(2) respectively. Upon receiving the timing signal, the NRZ signals NRZ1 and NRZ2 are read from the FIFO memories 52(1), 51(2) respectively in sync with a frame phase in the digital audio router (hereinafter called an internal frame phase), and are supplied to a selector 54. Thus, as is shown in FIGS. 2D and 2E, the NRZ signals NRZ1 and NRZ2 having the matched frame phases are input to the selector 54.

The selector 54 is a matrix switch of two inputs and two outputs, for example. The CPU circuit/apparatus internal timing signal generating circuit 53 supplies a switching signal to the selector 54 at a boundary portion between frames in the internal frame phase (as shown in FIG. 2F). Upon receiving the switching signal, the NRZ signals of two systems, to which switching processing is performed, are supplied to encoders 55(1), 55(2) from the selector 54.

Upon receiving the timing signal from the CPU circuit/apparatus internal timing signal generating circuit 53, the encoders 55(1), 55(2) modulate the NRZ signals to the AES/EBU signals AESO1, AESO2 respectively, to be output from the digital audio router. FIG. 2G shows a condition in which the output AES/EBU signal AESO1 is switched to the frame 4 of the input AES/EBU signal AESI1, from the frame 1 of the input AES/EBU signal AESI2.

SUMMARY OF THE INVENTION

In the digital audio router shown in FIG. 1, the AES/EBU signals can be switched by the frame, but are not switched by the block (including frames 0 to 191). Therefore, the switching is carried out between frames within one block as shown in FIG. 2G. Accordingly, the channel status information represented by the channel status bit (see FIG. 3) is interrupted by the switching halfway through the block, and becomes discontinuous at a portion where the switching is performed.

With such discontinuity in the channel status information, the following disadvantage may occur. Specifically, in the case where a VTR or audio mixer or the like that is a destination of the AES/EBU signal output from the digital audio router performs CRC (Cyclic Redundancy Check) using a CRC cord incorporated in the channel status bit C, a CRC error that is an error in the channel status information is detected. In this regard, there is an apparatus that mutes audio for a certain period of time depending on models of a VTR or audio mixer, when detecting an error of the channel status information. Therefore, in a system where such VTR or audio mixer is arranged in the stage subsequent to the digital audio router, part of original audio data may be lost due to the discontinuity in the channel status information which is subsidiary information, when the digital audio router performs the switching.

It should be noted that, the channel status bit is added to respective channels in MADI (Multichannel Audio Digital Interface) format having the AES/EBU signals of 28 systems (56 channels) serially in parallel, other than to the AES/EBU signals. Therefore, the channel status information also becomes discontinuous when the digital audio router switches signals of the MADI format.

In view of the above, it is desirable to provide a digital signal switching apparatus that inputs and outputs a digital signal to which status information formed of a block including a plurality of frames such as a channel status bit in the AES/EBU format or MADI format is added, and to retain the continuity of the status information at a portion where the switching is performed.

According to an embodiment of the present invention, there is provided a digital signal switching apparatus which inputs digital signals of two or more systems having a format of adding status information formed of a block including a plurality of frames to data and which outputs the input digital signals processed by switching processing. The digital signal switching apparatus includes: an information retriever, a storage, and an adder. The information retriever retrieves the status information from the digital signal to which the switching processing was performed; the storage stores one or more blocks of the status information retrieved by the information retriever; and the adder adds again the status information stored in the storage by the block to a position of the status information in the digital signal to which the switching processing was performed.

According to an embodiment of the present invention, there is provided a switching method for a digital signal switching apparatus which inputs digital signals of two or more systems having a format of adding status information formed of a block including a plurality of frames to data and which outputs the input digital signal processed by switching processing. The method includes the steps of: performing the switching processing on the input digital signals; retrieving the status information from the digital signal to which the switching processing was performed; storing one or more blocks of the status information retrieved; and adding again the stored status information by the block to a position of the status information of the digital signal on which the switching processing was performed.

According to the embodiments of the present invention, the digital signal switching apparatus inputs and outputs digital signals to which status information formed of a block including a plurality of frames is added. The status information is retrieved from the digital signal on which switching processing was performed, and one or more blocks of the status information is stored. Then, the stored status information is added again to the digital signal on which the switching processing was performed.

Accordingly, the status information in the digital signal on which the switching processing was performed is corrected so that continuity of the blocks is retained in the portion where the switching was performed.

According to the embodiments of the present invention, the continuity of the blocks is retained in the portion where the switching is performed in the digital signal switching apparatus that inputs and outputs digital signals having a format of adding status information formed of a block including a plurality of frames such as the channel status bit in the AES/EBU format or MADI format.

DESCRIPTION OF THE PREFERRED EMBODIMENTS

Figure 4:
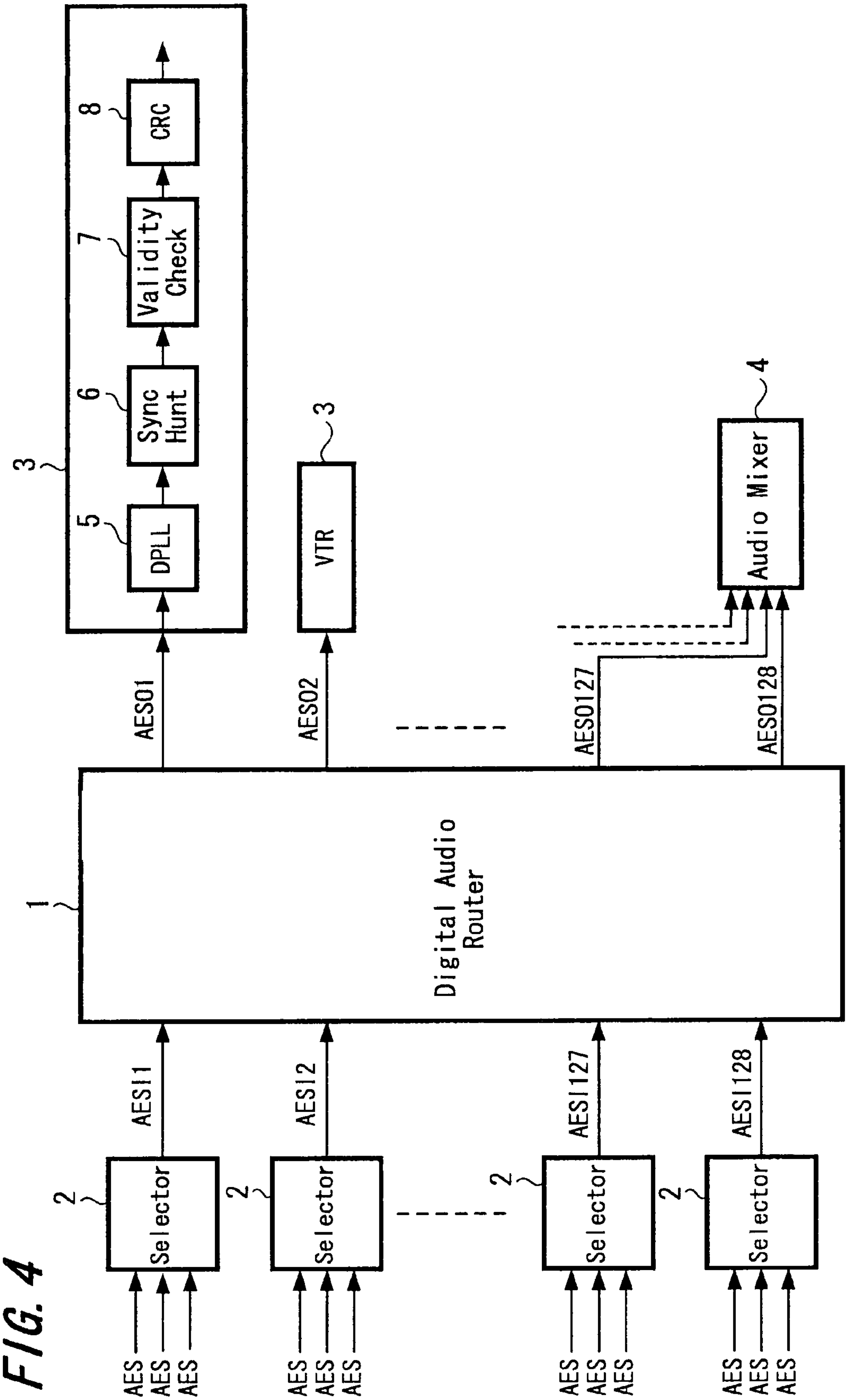
FIG. 4 is a diagram showing an example of the whole configuration of a system that uses a digital audio router according to an embodiment of the present invention.

A digital audio router for AES/EBU signals according to an embodiment of the present invention is hereinafter described specifically with reference to drawings. FIG. 4 is a diagram showing an example of the whole configuration of a system that uses a digital audio router 1 according to an embodiment of the present invention. The digital audio router 1 has 128 systems of inputs and outputs, respectively.

For example, in a broadcast station, a selector 2 selects AES/EBU signals AESI1 to AESI128 of 128 systems from the audio signals AES which are output from a plurality of microphones, video cameras or the like (not shown in the figure) inside or outside the broadcast station and which are modulated to the AES/EBU format. These AES/EBU signals AESI1 to AESI128 of 128 systems are input into the digital audio router 1.

The AES/EBU signals AESO1 to AES0128 output from the digital audio router 1 are supplied to a plurality of VTRs 3, audio mixers 4 and the like. The VTRs 3 and audio mixers 4 perform not only original processing of recording and mixing the input AES/EBU signals, but also processing of generating from the input AES/EBU signals a reference signal so that the VTRs 3 and audio mixers 4 operate in sync with the digital audio router 1.

Figure 1:
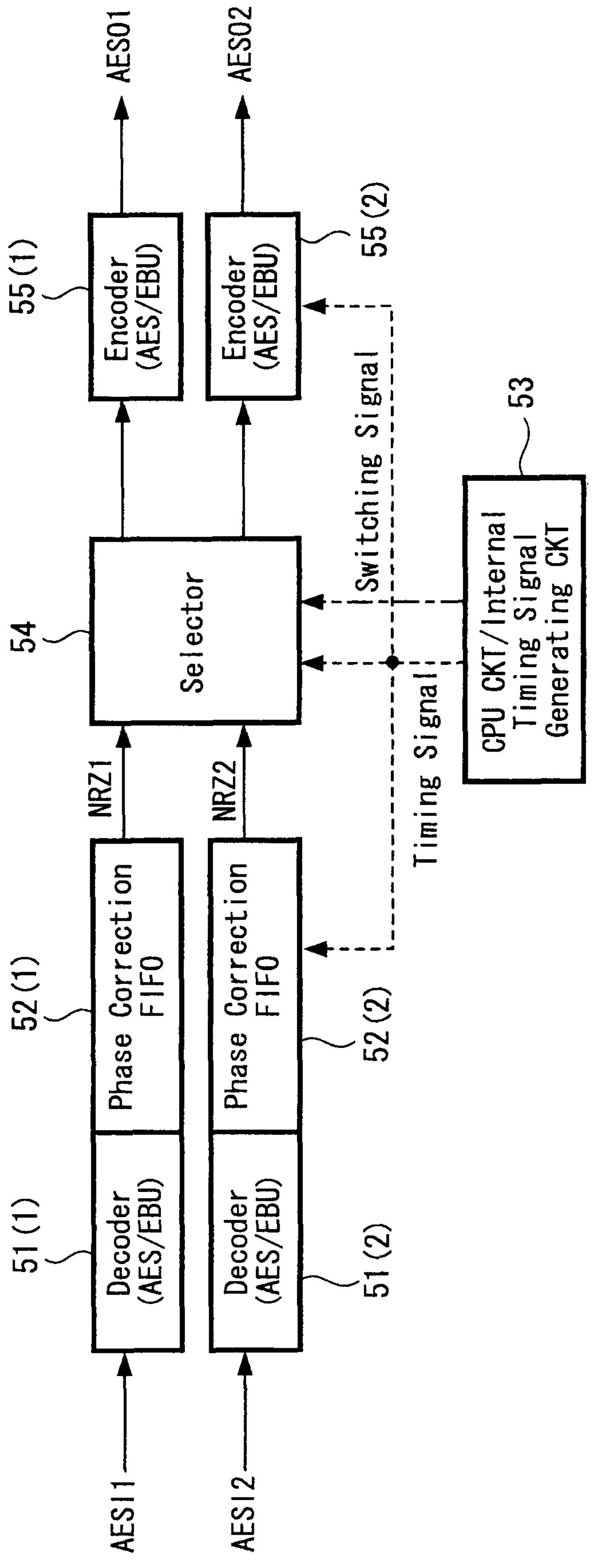
FIG. 1 (RELATED ART)
FIG. 1 is a diagram showing an example of a configuration of a digital audio router of the related art.
Figures 2A, 2B, 2C, 2D, 2E, 2F, 2G:
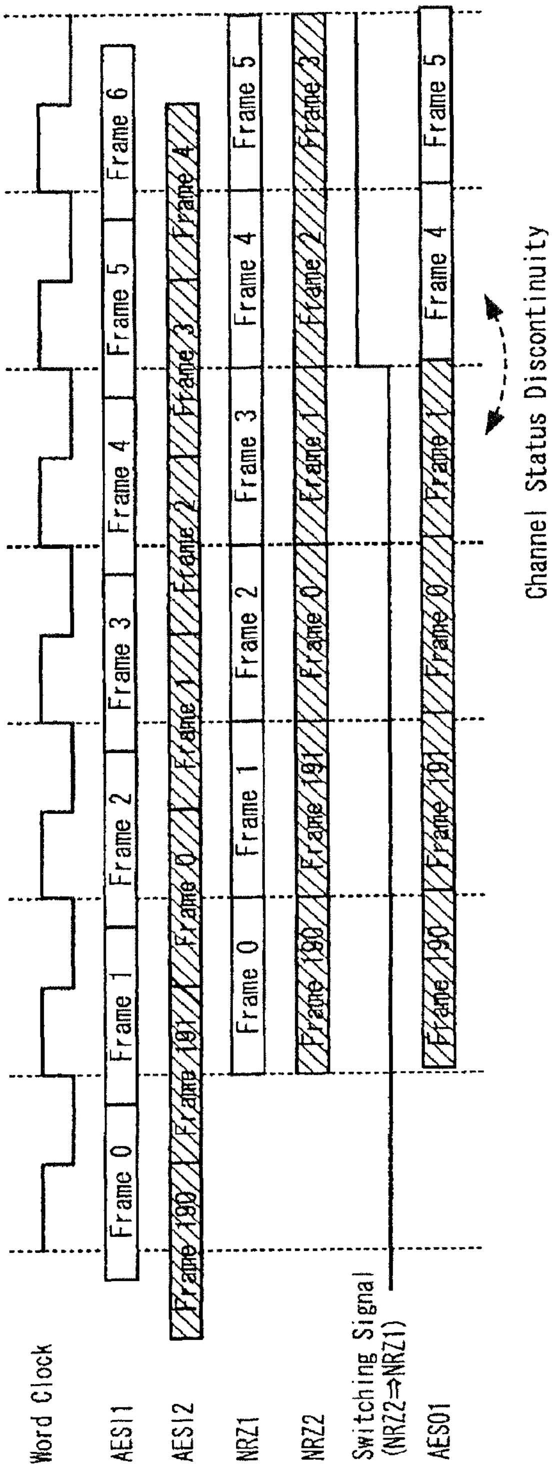
FIGS. 2A to 2G show an example of a timing chart when the digital audio router shown in FIG. 1 performs a switching operation.
Figure 3:
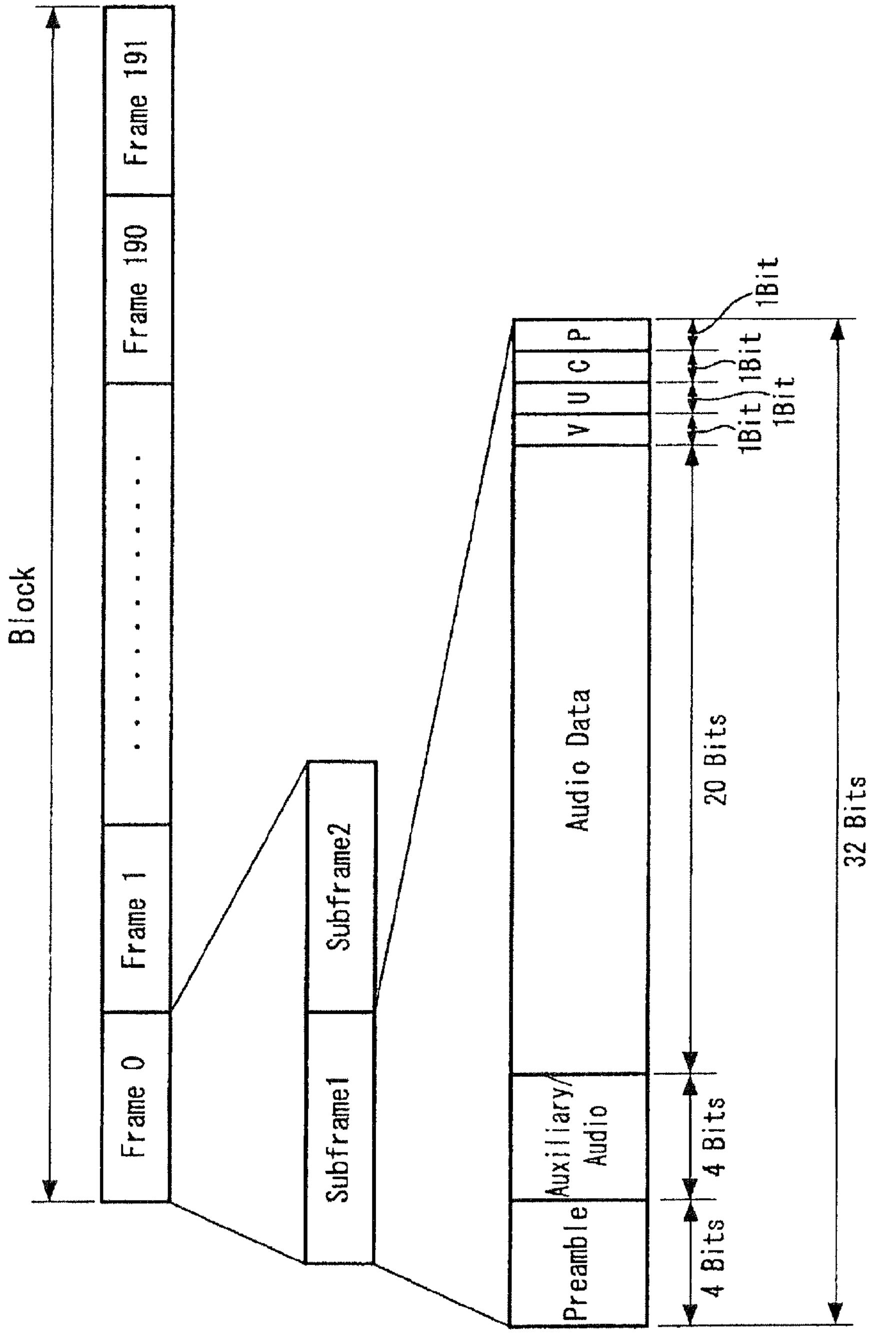
FIG. 3 is a diagram showing an AES/EBU format.

FIG. 4 shows a circuit for generating such operation reference signal, represented by the VTR 3 provided at the upper end. The AES/EBU signal input to the VTR 3 is supplied to a reception/demodulation DPLL (Digital PLL) 5. The DPLL 5 generates a clock signal of a predetermined frequency (128 fs, for example) that is synchronized with a sync-target portion (preamble shown in FIG. 3) of the AES/EBU signal, and this clock signal is supplied to respective circuits in the subsequent stages. Further, the AES/EBU signal is demodulated to a NRZ (Non Return to Zero) signal upon receiving the clock signal, and then the NRZ signal is supplied to a sync hunt circuit 6.

The sync hunt circuit 6 generates the operation reference signal of the same shape as the word clock from the start position of the preamble in the NRZ signal.

A validity check circuit 7 checks a parity bit P (see FIG. 3) of the NRZ signal supplied from the sync hunt circuit 6; a CRC (Cyclic Redundancy Check) checker 8 checks an error thereof; and afterward the NRZ signal is supplied to subsequent circuits not shown in the figure (circuits for a video/audio recording processing system, in the case of a VTR).

Figure 5:
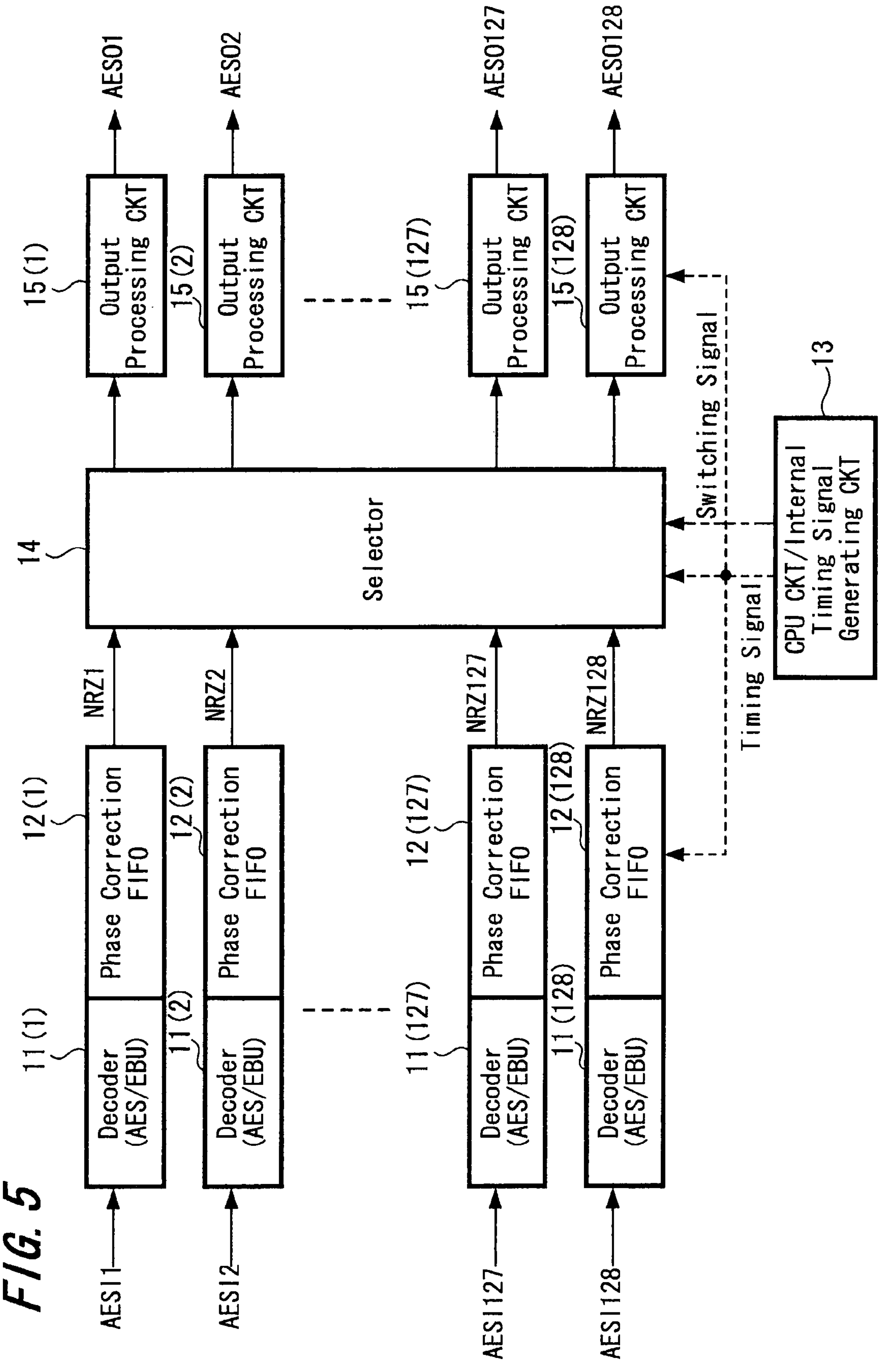
FIG. 5 is a diagram showing a configuration of a digital audio router according to an embodiment of the present invention.

Next, the configuration of the digital audio router 1 is described using FIG. 5. The AES/EBU signals AESI1 to AESI128 of 128 systems (phases are not matched with each other) that are input to the digital audio router 1 are supplied to decoders 11(1) to 11(128), respectively. The decoders 11(1) to 11(128) check the input AES/EBU signals to detect no-signal indicating that the input of the AES/EBU signal is suddenly stopped by the breaking of cable wire or the like, and perform a parity check and format check (check on transmission errors caused by a degraded cable condition or the like) and the like. Upon detecting no abnormality, the AES/EBU signals are demodulated to NRZ signals to be written to FIFO memories 12(1) to 12(128) for phase correction. On the other hand, if abnormality is detected, the AES/EBU signal is muted.

A CPU circuit/apparatus internal timing generating circuit 13 supplies a timing signal (word clock) generated inside the digital audio router 1 to the FIFO memories 12(1) to 12(128), respectively. In the case where the NRZ signals are written to the FIFO memories 12(1) to 12(128) (in the case where the aforementioned abnormality is not detected in the decoders 11(1) to 11(128)), the NRZ signals NRZ1 to NRZ128 are read from the FIFO memories 12(1) to 12(128) respectively in sync with the frame phase of the digital audio router 1 (hereinafter called internal frame phase) upon receiving the timing signal, and are supplied to a selector 14. Thus, the NRZ signals NRZ1 to NRZ128 the frame phases of which are matched are input to the selector 14.

The selector 14 is a matrix switch having 128 inputs and 128 outputs, for example, and performs switching processing on each of the NRZ signals NRZ1 to NRZ128 by the ON/OFF operation of the connection switches (semiconductor elements) provided to respective intersection points of 128 input signal wires and 128 output signal wires. The CPU circuit/apparatus internal timing generating circuit 13 supplies the switching signal to the selector 14 at the boundary portion between frames in the internal frame phase. The selector 14 supplies the NRZ signals of 128 systems, on which the switching processing was performed upon receiving the switching signal, to the output processing circuit 15(1) to 15(128).

Figure 6:
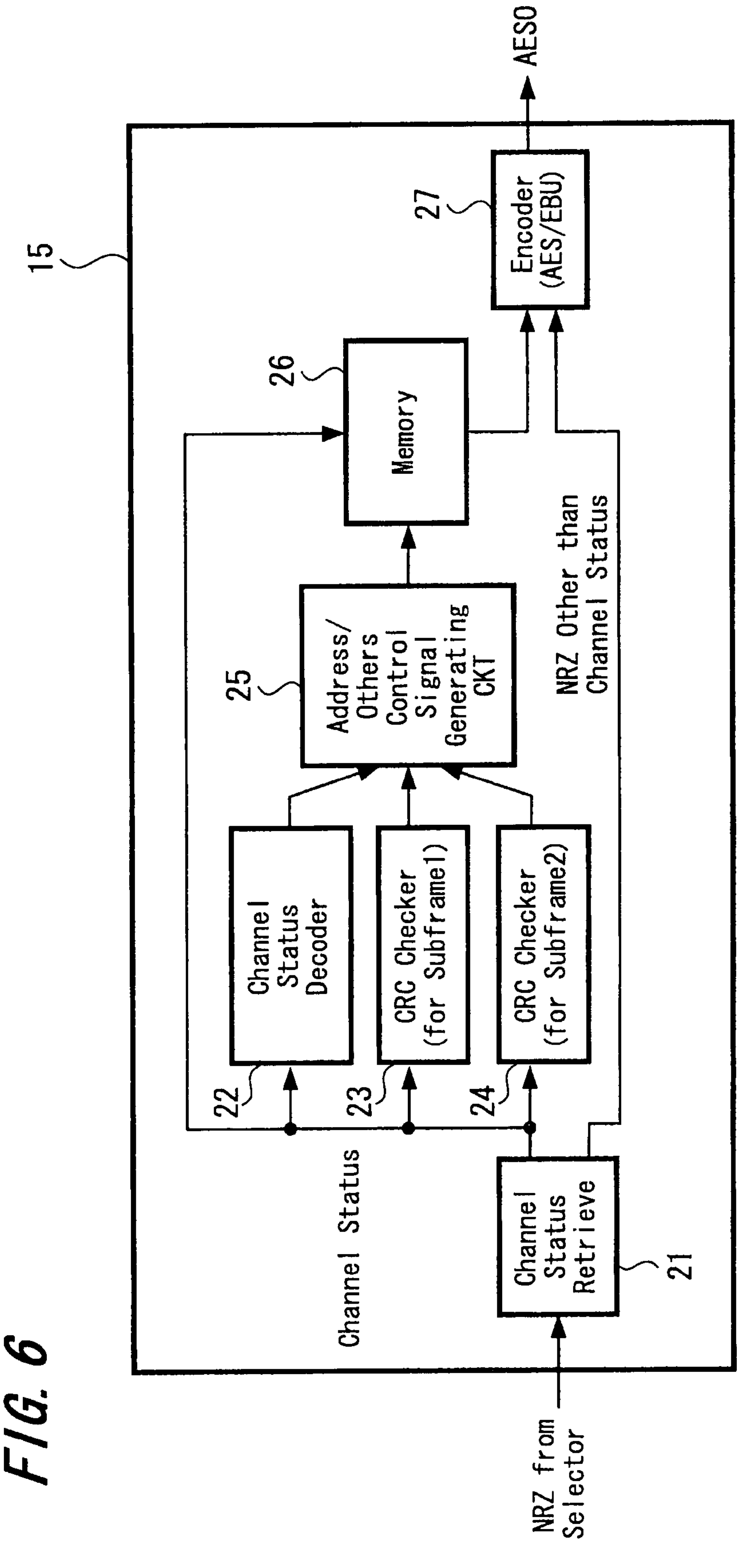
FIG. 6 is a diagram showing a configuration of an output processing circuit.

FIG. 6 is a block diagram showing a configuration of respective output processing circuits 15. A channel status retrieving circuit 21 retrieves the channel status C (see FIG. 3) from the NRZ signal input into the output processing circuit 15. The channel status C is supplied to a channel status decoder 22, a CRC checker (for subframe1) 23, a CRC checker (for subframe2) 24, and a memory 26 respectively from the channel status retrieving circuit 21, and also the NRZ signal except the channel status C is supplied to an encoder 27.

The channel status decoder 22 decodes the channel status information from the channel status C of total 192 bits for one block (frame 0 to frame 191). Then, the channel status decoder 22 supplies information on channel modes and information indicating whether the signal is for professional use or nonprofessional use, out of the channel status information, to an address/others control signal generating circuit 25.

The CRC checker (for subframe1) 23 and CRC checker (for subframe2) 24 carry out the error check of the channel status C of the subframe1 and subframe2 (see FIG. 3) respectively by the cyclic redundancy check method, and supply information indicating the checked result to the address/others control signal generating circuit 25.

The memory 26 includes a plurality of banks that store the channel status C for one block, respectively. These banks store in advance the channel status C for one block that represents standard channel information (for example, frequency: 48 kHz; bit number of audio data: 24; channel mode: 2 channel modes; and professional use or the like).

The address/others control signal generating circuit 25 carries out the address control and others when the channel status C is written to and read from the memory 26. When writing the channel status C, the address/others control signal generating circuit 25 carries out the control as shown in the following (a) to (c), in accordance with the contents of information from the channel status decoder 22, CRC checker (for subframe1) 23, and CRC checker (for subframe2) 24.

(a) The Case of the Channel Status Decoder 22 not Supplying the Information Indicating a Single Channel Mode and the Information Indicating a Signal for Nonprofessional Use In this case, on condition that the results checked by both the CRC checker (for subframe1) 23 and CRC checker (for subframe2) 24 are normal, the channel status C supplied from the channel status retrieving circuit 21 is stored in one of the banks in the memory 26 in order (the aforementioned channel status C stored in advance is overwritten), with the channel status C of the frame 0 (a frame where preamble of the subframe1 is Z) at the head. If the result checked by any one of the CRC checkers 23 and 24 is abnormal, the channel status C of the block is not stored in the memory 26.

(b) The Case of the Channel Status Decoder 22 Supplying Information Indicating a Single Channel Mode In the case of the single channel mode, the audio data is transmitted using only the subframe1, and the audio data is not transmitted using the subframe2. Therefore, if the result checked by the CRC checker (for subframe1) 23 is normal, the channel status C is stored in one of the banks in the memory 26, similarly to the above-described case (a).

(c) The Case of the Channel Status Decoder 22 Supplying Information Indicating a Signal for Nonprofessional Use The CRC code is not added to the channel status in the signal for nonprofessional use, and therefore the channel status C is stored in one of the banks in the memory 26, similarly to the above-described case (a), regardless of the results checked by the CRC checkers 23 and 24.

The channel status C is stored in one of the banks in the memory 26 as described above. Having stored the channel status C for one block in the bank, the address/others control signal generating circuit 25 reads the channel status C for one block from the bank in sync with the internal frame phase, and stores the subsequent channel status C, which is supplied to the memory 26 from the channel status retrieving circuit 21, in another bank in the memory 26. Subsequently, the same processing is repeated each time the status C for one block is stored in the bank. Thus, the channel status C is read from the memory 26 by the block.

The channel status C thus read from the memory 26 by the block is supplied to the encoder 27. The encoder 27 adds again the channel status C read from the memory 26 to the position of the channel status C in the NRZ signal (NRZ signal except the channel status C) supplied from the channel status retrieving circuit 21. Further, the preambles are added again so that the preambles of the subframe1 and subframe2 of the frame at the head, where the channel status C (the channel status C of frame 0) is added again, are Z and Y respectively, and the preambles of the subframe1 and subframe2 of the other frames are X and Y respectively. Then, upon receiving the timing signal supplied from the CPU circuit/apparatus internal timing signal generating circuit 13 (see FIG. 5), the NRZ signal is modulated to the AES/EBU signal to be output.

As shown in FIG. 5, AES/EBU signals AESO1 to AESO128 output from respective output processing circuits 15(1) to 15(128) are supplied to the VTRs 3, audio mixers 4 and the like (see FIG. 4) from the digital audio router 1.

Next, the operation of the digital audio router 1 is described with respect to the following cases:

the case where normal AES/EBU signals are input;

the case where abnormality is detected in the input AES/EBU signals; and the case where the AES/EBU signals have not been input from the beginning.

[The Case of the Normal AES/EBU Signals Being Input]

First, the operation in the case where the normal AES/EBU signals are input (abnormality is not detected with the detection of no signal, the parity check and format check by the decoders 11(1) to 11(128)). FIG. 7 shows an example of a timing chart of the switching operation in the case where the AES/EBU signal AESO1 output from the output processing circuit 15(1) is switched to the input AES/EBU signal AESI2 from the input AES/EBU signal AESI1.

Figures 7A, 7B, 7C, 7D, 7E, 7F, 7G, 7H, 7I:
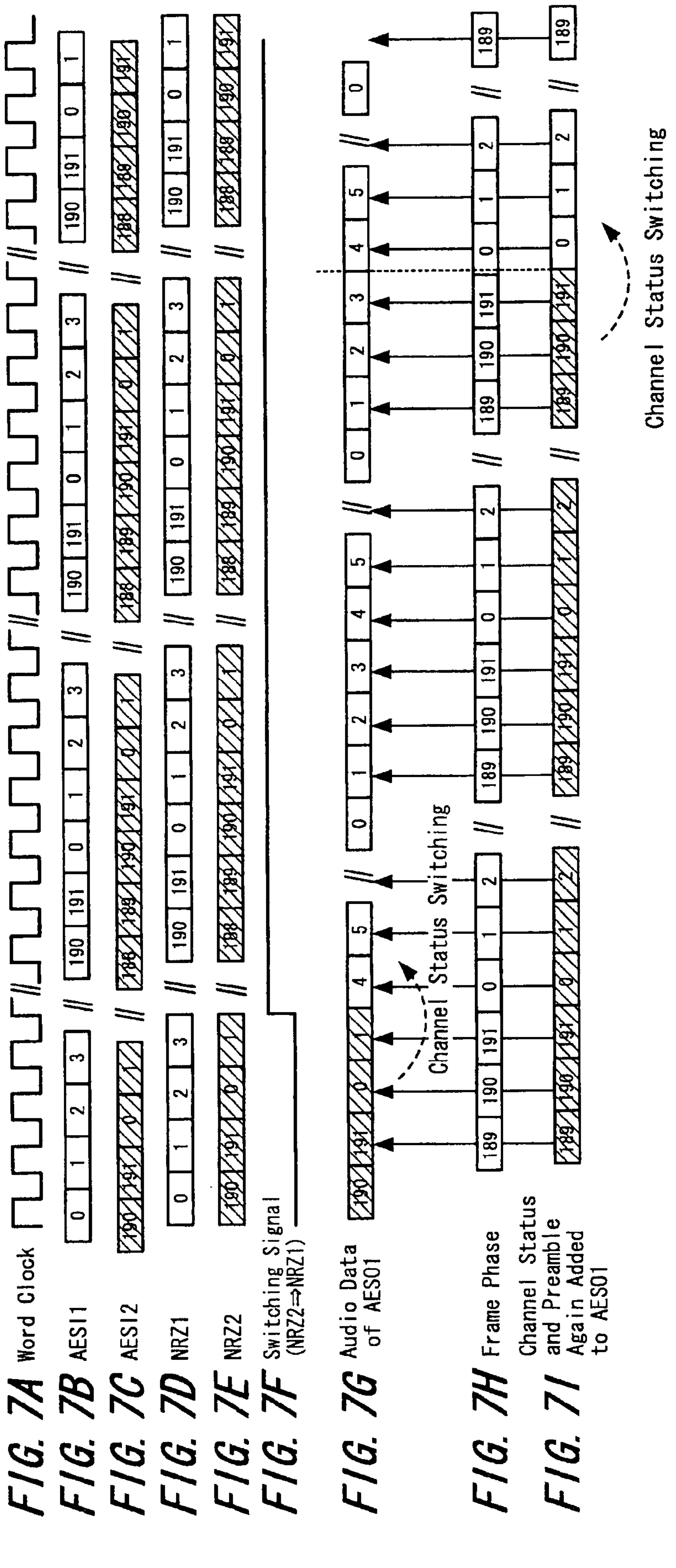
FIGS. 7A to 7I show an example of a timing chart when the digital audio router shown in FIG. 5 performs a switching operation.

The AES/EBU signal AESI1 and AESI2 (usually phases are not matched with each other, as shown in FIGS. 7B and 7C) are demodulated to the NRZ signals by the decoders 11(1) and 11(2) respectively, to be written to the FIFO memories 12(1) and 12(2) for phase correction.

Upon receiving the timing signal (word clock in FIG. 7A) from the CPU circuit/apparatus internal timing signal generating circuit 13, the NRZ signals NRZ1 and NRZ2 are read from the FIFO memories 12(1) and 12(2) respectively in sync with the frame phase of the digital audio router 1 to be supplied to the selector 14. Thus, the NRZ signals NRZ1 and NRZ2 frame phases of which are matched are input to the selector 14, as shown in FIGS. 7D and 7E.

The CPU circuit/apparatus internal timing signal generating circuit 13 supplies to the selector 14 the switching signal (see FIG. 7F) with which the NRZ signal supplied to the output processing circuit 15(1) is switched to the NRZ2 from the NRZ1 at the boundary portion between frames in the frame phase of the digital audio router 1. Upon receiving the switching signal, the selector 14 switches the NRZ signal supplied to the output processing circuit 15(1) to the NRZ2 from the NRZ1.

Accordingly, as shown in FIG. 7G, the portion of the audio data in the AES/EBU signal AESO1 output from the output processing circuit 15(1) is switched to the frame 4 of the input AES/EBU signal AESI1, from the frame 1 of the input AES/EBU signal AESI2.

Here, with the aforementioned processing in the output processing circuit 15(1), the channel status C is added again to the AES/EBU signal AESO1 by the block in sync with the internal frame phase (FIG. 7H) and also the preamble is added again (FIG. 7I). Thus, the channel status C in the AES/EBU signal AESO1 is corrected to retain the continuity of the blocks in the portion where the audio data is switched.

FIGS. 7A to 7I show the switching operation performed in the digital audio router 1. In addition, in the case where the selection is switched in a selector 2 at the preceding stage of the digital audio router 1 (in the case of the input AES/EBU signal AESI1 and input AES/EBU signal AESI2 being switched to other AES/EBU signals), the channel status C is also corrected by the processing in the output processing circuit 15(1) to retain the continuity of the blocks in the portion where the audio data is switched.

As described above, the channel status C retains the continuity of the blocks. Therefore, in the case where the VTR 3 and audio mixer 4 (FIG. 4), to which the AES/EBU signal is output from the digital audio router 1, perform the error check with the CRC checker (CRC checker 8 for VTR 3 at the upper end in FIG. 4) using the CRC cord incorporated in the channel status bit C (FIG. 3), the channel status information is prevented from being detected as the information having an error caused by the discontinuity of the channel status C. Hence, for example, even if the VTR 3 and audio mixer 4 are kinds of apparatuses muting audio for a certain period of time when detecting an error of the channel status information, audio data can be prevented from being lost due to the muting, when the switching is performed by the digital audio router 1.

It should be noted that the channel status C added again to the AES/EBU signal is delayed compared to the audio data by the amount of time approximately corresponding to one block (time for storing one block in the memory 26 and time for processing in the output processing circuit 15(1) in total); however, since the channel status information does not require processing in real time, such amount of delay may not cause a problem.

[The Case of Abnormality Being Detected in the Input AES/EBU Signals]

Next, operations in the case where no signal is detected or abnormality is detected with the parity check and the format check in any of the decoders 11(1) to 11(128) are described (specifically, when the AES/EBU signal input into the digital audio router 1 is suddenly stopped by the breaking of a cable wire or the like, or the transmission error is caused by a deteriorated cable condition). In such case, the decoder 11 detecting the abnormality mutes the input AES/EBU signal as described above, and the selector 14 stops supplying the NRZ signal to the output processing circuit 15 outputting the input AES/EBU signal until that time.

If the AES/EBU signal is not output from the output processing circuit 15, the DPLL (DPLL 5 in FIG. 4) is unlocked, because the clock signal is generated from the input AES/EBU signal by the reception/demodulation DPLL in the VTR 3 and audio mixer 4 in the following stages, as mentioned above. Therefore, the VTR 3 and audio mixer 4 may not operate in sync with the digital audio router 1 afterwards for a while.

Accordingly, if the NRZ signal is not supplied to the respective output processing circuits 15 from the selector 14, the address/others control signal generating circuit 25 reads the channel status C from the memory 26 by the block, the channel status C being retrieved by the channel status retrieving circuit 21 from the NRZ signal having been supplied (specifically, the NRZ signal before detecting the abnormality) and being stored in the memory 26.

The encoder 27 modulates the channel status C read from the memory 26 to the AES/EBU signal through the following processing steps (a) to (c) to be output:

(a) adding the channel status C read from the memory 26 to the position of the channel status C in the AES/EBU format;

(b) adding Z and Y as the preamble to the subframe1 and subframe2 of the frame to which the channel status C of the head portion (channel status C of frame 0) was added, respectively, and adding X and Y as the preambles to the subframe1 and subframe2 of the other frames; and (c) adding “1” (indicating abnormality) to the position of the validity bit V (FIG. 3) in the AES/EBU format.

Accordingly, in the case where the AES/EBU signal input to the digital audio router 1 is suddenly stopped and the transmission error occurs, the AES/EBU signal (with the preamble, channel status C and the validity bit V, not having original audio data) is continuously output from the digital audio router 1. Therefore, the reception/demodulation DPLL in the VTR 3 and audio mixer 4 at the subsequent stages is not unlocked. As a result, the VTR 3 and audio mixer 4 can operate continuously in sync with the digital audio router 1.

In addition, since the validity bit V shows a value indicating abnormality, the existence of abnormality can be checked by the validity check circuit 7 (FIG. 3) in the VTR 3 and audio mixer 4. Therefore, interpolation processing, mute processing and the like can be carried out without recording and/or mixing the audio in the input AES/EBU signal.

[The Case of the AES/EBU Signals not Being Input from the Beginning]

Next, operations in the case where the AES/EBU signal is not input to the digital audio router 1 from the beginning are described. In such case, the channel status C for one block (channel status C that represents standard channel status information) stored in advance is stored without any change in the bank of the memory 26 in respective output processing circuits 15. The address/others control signal generating circuit 25 reads the channel status C from the memory 26 by the block.

The encoder 27 modulates the channel status C read from the memory 26 to the AES/EBU signal to be output, through the same processing steps as the case where abnormality was detected in the input AES/EBU signal.

Accordingly, in the case where the AES/EBU signal is not input to the digital audio router 1 from the beginning, the AES/EBU signal (with the preamble, channel status C and the validity bit V, not having original audio data) is continuously output from the digital audio router 1. Therefore, the VTR 3 and audio mixer 4 at the subsequent stages can operate continuously in sync with the digital audio router 1.

In addition, since the validity bit V shows a value indicating abnormality, the existence of abnormality can be checked by the validity check circuit 7 (FIG. 3) in the VTR 3 and audio mixer 4. Therefore, interpolation processing, mute processing, and the like can be carried out without recording and/or mixing the audio in the input AES/EBU signal.

It should be noted that the above-described embodiments of the present invention is applied to the digital audio router of 128 input/output systems, but an embodiment of the present invention can be applied to a digital audio router of any number of input/output systems.

In addition, the above-described embodiment of the present invention is applied to the digital audio router using AES/EBU signals, but an embodiment of the present invention may be applied to a digital audio router that inputs and outputs the digital audio signal of MADI (Multi-channel Audio Digital Interface) format having the AES/EBU signals of 28 systems (56 channels) serially in parallel. Furthermore, an embodiment of the present invention may be applied to other digital signal switching apparatuses than the digital audio router, the apparatuses inputting and outputting digital signals to which status information formed of a block including a plurality of frames is added.

It should be understood by those skilled in the art that various modifications, combinations, sub-combinations and alterations may occur depending on design requirements and other factors insofar as they are within the scope of the appended claims or the equivalents thereof.

What is claimed is:

1. A digital signal switching apparatus inputs digital signals of two or more systems, each digital signal having a format of adding, status information formed as a block from a plurality of frames, and the digital signal switching apparatus outputs the input digital signals processed by switching processing, comprising:

means for retrieving blocks of the status information from the digital signal on which the switching processing was performed, the digital signal without the status information being directly output by the retrieving means;

means for storing one or more blocks of the status information retrieved by the retrieving means;

and means for adding again, to the digital signal directly output from the retrieving means, the status information from the storing means by the block order to a position of the status information in a frame of the digital signal on which switching processing was performed by the digital signal switching apparatus, wherein when the digital signal is one of not input and suddenly stopped, the status information is continuously output from the storage means.

2. A digital signal switching apparatus according to claim 1, further comprising:

means for checking errors on the status information retrieved b the retrieving means, wherein the adding means adds the status information in which the error was not detected by the checking means.

3. A digital signal switching apparatus according to claim 1, further comprising:

means for performing at least one of operations of detecting no signal, error checking and format checking on the input digital signal; and means for muting the digital signal in which abnormality was detected by the performing means, wherein after the abnormality is detected by the performing means the adding means outputs the status information being retrieved by the retrieving means from the digital signal before detecting abnormality and being stored in the storing means, in accordance with the format.

4. A digital signal switching apparatus according to claim 3, wherein the adding means adds information indicating abnormality detected by the performing means to a position of information indicating presence/absence of abnormality.

5. A digital signal switching apparatus according to claim 1, wherein:

the storing means stores, in advance of receiving the digital signals, one block of status information having predetermined contents; and the adding means outputs the status information stored in the storing means in accordance with the format in a condition where no data of the digital signal is input.

6. A digital signal switching apparatus according to claim 1, wherein digital audio signals of AES/EBU format or MADI (Multi Audio Digital Interface) format are input; and the status information is formed of a channel status bit.

7. A switching method for a digital signal switching apparatus which inputs digital signals of two or more systems, each digital signal having a format of adding status information formed as a block from a plurality of frames, and the digital signal switching apparatus outputs the input digital signals processed by switching processing, the method comprising the steps of:

performing the switching processing on the input digital signals;

retrieving blocks of the status information form the digital signal on which the switching processing was performed and directly outputting the digital signal without the status information;

storing in one or more blocks of the status information retrieved, and adding again to the digital signal directly output by the retrieving step, the stored status information by the block to a position of the status information in a fame of the digital signal on which switching processing was performed, wherein when the digital signal is one of not input and suddenly stopped, the status information is continuously output from the storage means.

8. A digital signal switching apparatus which inputs digital signals of two or more systems, each digital signal having a format of adding status information formed as a block from a plurality of frames, and the digital signal switching apparatus outputs the input digital signals processed by switching processing, comprising:

an information retriever configured to retrieve blocks of the status information from the digital signals on which the switching processing was performed and to directly output the digital signal without the status information;

a storage configured to store one or more blocks of the status information retrieved by the information receiver; and an adder configured to add again, to the digital signal directly output by the information retriever, the status information stored in the storage by the block order to a position of the status information in a frame of the digital signal on which the switching processing was performed, wherein when the digital signal is one of not input and suddenly stopped, the status information is continuously output from the storage means.

* * * * *